(12) United States Patent
Xu

(10) Patent No.: US 10,738,993 B2
(45) Date of Patent: Aug. 11, 2020

(54) LED GLASS FENCE HAVING MAIN BODIES WITH AND LED STRIP AND COLOR GRAPHICS ADJUSTING BELT

(71) Applicant: Zhiliang Xu, Guangzhou (CN)

(72) Inventor: Zhiliang Xu, Guangzhou (CN)

( * ) Notice: Subject to any disclaimer, the term of this patent is extended or adjusted under 35 U.S.C. 154(b) by 0 days.

(21) Appl. No.: 16/424,505

(22) Filed: May 29, 2019

(65) Prior Publication Data

US 2019/0368721 A1 Dec. 5, 2019

(30) Foreign Application Priority Data

May 29, 2018 (CN) .......................... 2018 1 0531896

(51) Int. Cl.
| | | |
|---|---|---|
| *F21V 33/00* | (2006.01) | |
| *F21V 31/00* | (2006.01) | |
| *H05B 45/10* | (2020.01) | |
| *H05B 45/20* | (2020.01) | |
| *H05B 47/12* | (2020.01) | |
| *F21Y 115/10* | (2016.01) | |

(52) U.S. Cl.
CPC .......... *F21V 33/006* (2013.01); *F21V 31/005* (2013.01); *H05B 45/10* (2020.01); *H05B 45/20* (2020.01); *H05B 47/12* (2020.01); *F21Y 2115/10* (2016.08)

(58) Field of Classification Search
CPC ..... F21Y 2115/10; F21V 33/006; F21V 33/00
See application file for complete search history.

(56) References Cited

U.S. PATENT DOCUMENTS 8,297,777 B1 * 10/2012 McCall ................. F21V 33/006
362/145

FOREIGN PATENT DOCUMENTS

WO WO-2010077219 A1 * 7/2010 ......... G09F 15/0025

\* cited by examiner

*Primary Examiner* — Robert J May

(57) ABSTRACT

The present application discloses an LED glass fence, includes several main bodies, an upper cover and a pedestal, said pedestal is fixed to the ground, several said main bodies are fixed to each other and fixedly to mounted on said pedestal, said upper cover is fixedly assembled on the other end of several said main bodies, a gap and a groove are formed between several said main bodies, said gap connects to said groove, said LED glass fence also includes an LED strip and a transparent board, said LED strip is housed in said gap, said transparent board is fixedly assembled in the edge of said groove, the light of said LED strip radiates outward after the refraction of said transparent board. According to this design, the LED glass fence not only can be used for protection but also used for lighting, and can be as a landscaping lamp.

8 Claims, 3 Drawing Sheets

LED GLASS FENCE HAVING MAIN BODIES WITH AND LED STRIP AND COLOR GRAPHICS ADJUSTING BELT

CROSS-REFERENCE TO RELATED APPLICATIONS

This application is based upon and claims the benefit of priority to Chinese Patent Application No. 201810531896.4 filed with the Chinese Patent Office on 29 May 2018.

TECHNICAL FIELD

The present application relates to the field of construction, in particular, it relates to an LED glass fence.

BACKGROUND

Guard fence is set primarily in residence, highways, business districts, public places and the like sites for protecting the personal safety and equipment. The guard fence can be seen everywhere in our daily life. According to the difference in height of guard fence, the price of per meter will also be different. The guard fence is made of commonly used steel, such as: stainless steel, circular steel tube, square steel tube, profiled steel sheet or iron wire. The technology of surface treatment: automatic electrostatic powder spraying (i.e. static spray) or spray painting. In recent years, the inlaying of the aluminum alloy material and assembled fence is also popular.

The function of existing guard fence is single, only for protecting the personal safety and equipment; there is no any other function.

SUMMARY

In order to overcome the deficiencies of the prior art, the present application provides an LED glass fence, which provides with the function of lighting, entertainment and protection.

Said LED glass fence is achieved by the following technical solutions:

An LED glass fence, comprises several main bodies, an upper cover and a pedestal, said pedestal is fixed to the ground, several said main bodies are fixed to each other and fixedly to mounted on said pedestal, said upper cover is fixedly assembled on the other end of several said main bodies, a gap and a groove are formed between several said main bodies, said gap connects to said groove, said LED glass fence also includes an LED strip and a transparent board, said LED strip is housed in said gap, said transparent board is fixedly assembled in the edge of said groove, the light of said LED strip radiates outward after the refraction of said transparent board.

Further, said LED glass fence also includes a color graphics adjusting belt and two rollers, said color graphics adjusting belt is provided with several different shapes and different color of patterns, the mounting position of two said rollers is selected from the group consisting of said main body, said upper cover and said pedestal, said color graphics adjusting belt is set between two said rollers, and then with the rotation of said rollers, light emitted by said LED strip can produce different colors and patterns after passing through said color graphics adjusting belt.

Further, said upper cover is a solar panel, said LED glass fence also includes a driving device, a said roller connects with said driving device fixedly, said solar panel provides power supply for said driving device to drive said roller to turn.

Further, said LED glass fence also includes a decorative cover, said decorative cover is assembled on said pedestal fixedly.

Further, said LED glass fence also includes a control device and a sound sensor, said control device is electrically connected with said sound sensor and said LED strip, when the volume of sound signal received from said sound sensor is increasing, said control device controls said LED strip to weaken the brightness; when the volume of sound signal received from said sound sensor is reducing, said control device controls said LED strip to enhance the brightness.

Further, said sound sensor receives a sound signal whose volume is at 15-80 DB.

Further, said LED glass fence also includes an electrical wire, said LED strip is electrically connected to a power source by said electrical wire.

Further, said LED glass fence also includes a sealing cap, said sealing cap is mounted on said main body in order to make the junction of said LED strip and said electrical wire to be sealed.

Further, said main body is a profile, and the cross profile of said main body is two square frame which are set up and down.

Compared with the prior art, in the LED glass fence, there are a gap and a groove which are formed between several said main bodies, said gap is connected with said groove, the LED glass fence further includes a LED strip and a transparent board, said LED strip is housed in said gap, said transparent board is fixedly assembled in the edge of said groove, the light of said LED strip radiates outward after the refraction of said transparent board. According to this design, the LED glass fence not only can be used for protection but also used for lighting, and can be as a landscaping lamp.

Figure 1:
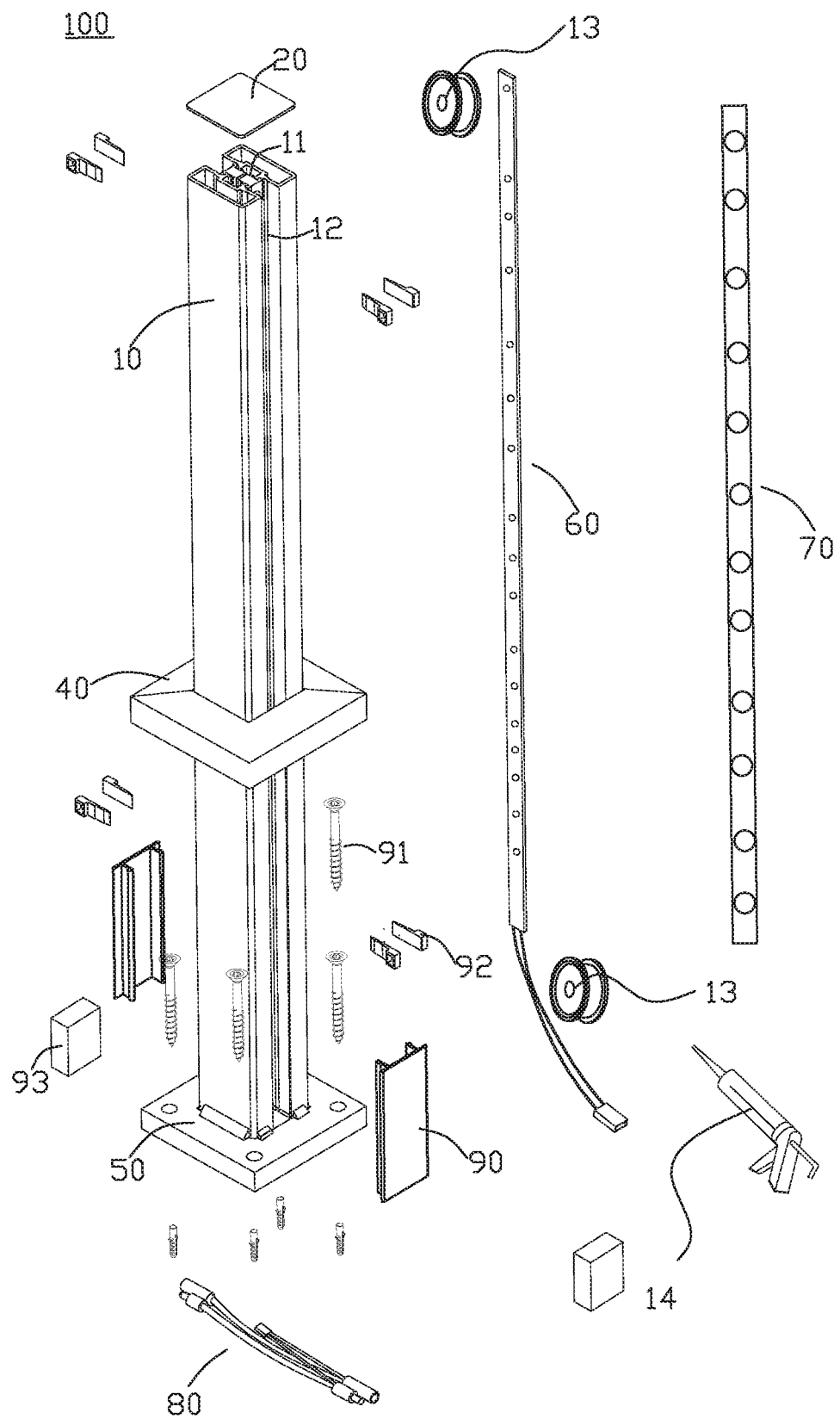
FIG. 1 is an exploded drawing of a preferred embodiment of LED glass fence.

In the drawings: 100, LED glass fence; 10, main body; 11, gap; 12, groove; 20, upper cover; 30, transparent board; 40, decorative cover; 50, pedestal; 60, LED strip; 70, color graphics adjusting belt; 80, electrical wire; 90, sealing cap; 91, fastener; 92, transparent board installation first auxiliary part component; 93, transparent board installation second auxiliary component.

DESCRIPTION OF EMBODIMENTS

Embodiments of the present application are described in further detail.

The present application may be further illustrated in the following example embodiment, but examples are not limiting the scope of the present application.

In addition, when a component is referred to as "fixedly mounted on" another component, it can be directly on another component or an in-between component may be present. When a component is considered to be "connected" another component, it can be directly connected to another component or an in-between component may be present.

When a component is considered to be "disposed on" another component, it can be directly disposed on another component or an in-between component may be present. The terms used herein, such as "vertical", "horizontal", "left", "right" and a similar expression are merely for a purpose of illustration.

Unless having otherwise defined, all technical and scientific terms used herein have the same meaning as commonly understood by those technicians in the technical field of the present application. The terms used in the description of the present application are used for describing particular embodiment, rather than intend to limit the present application. The terms "and/or" as used herein include one or several associated items listed and all arbitrary combinations of them.

Figure 2:
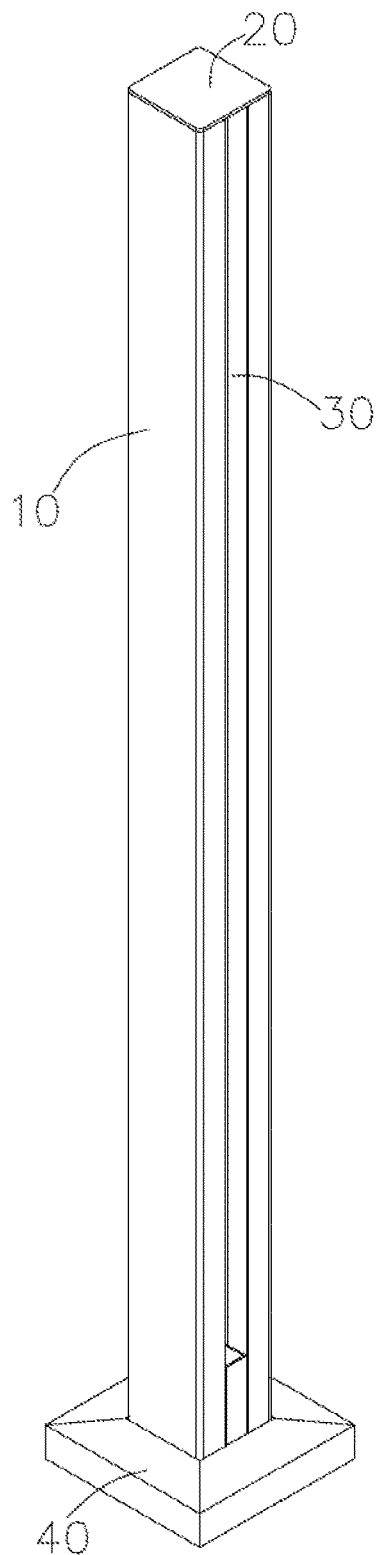
FIG. 2 is an assembly drawing of a preferred embodiment of LED glass fence.
Figure 3:
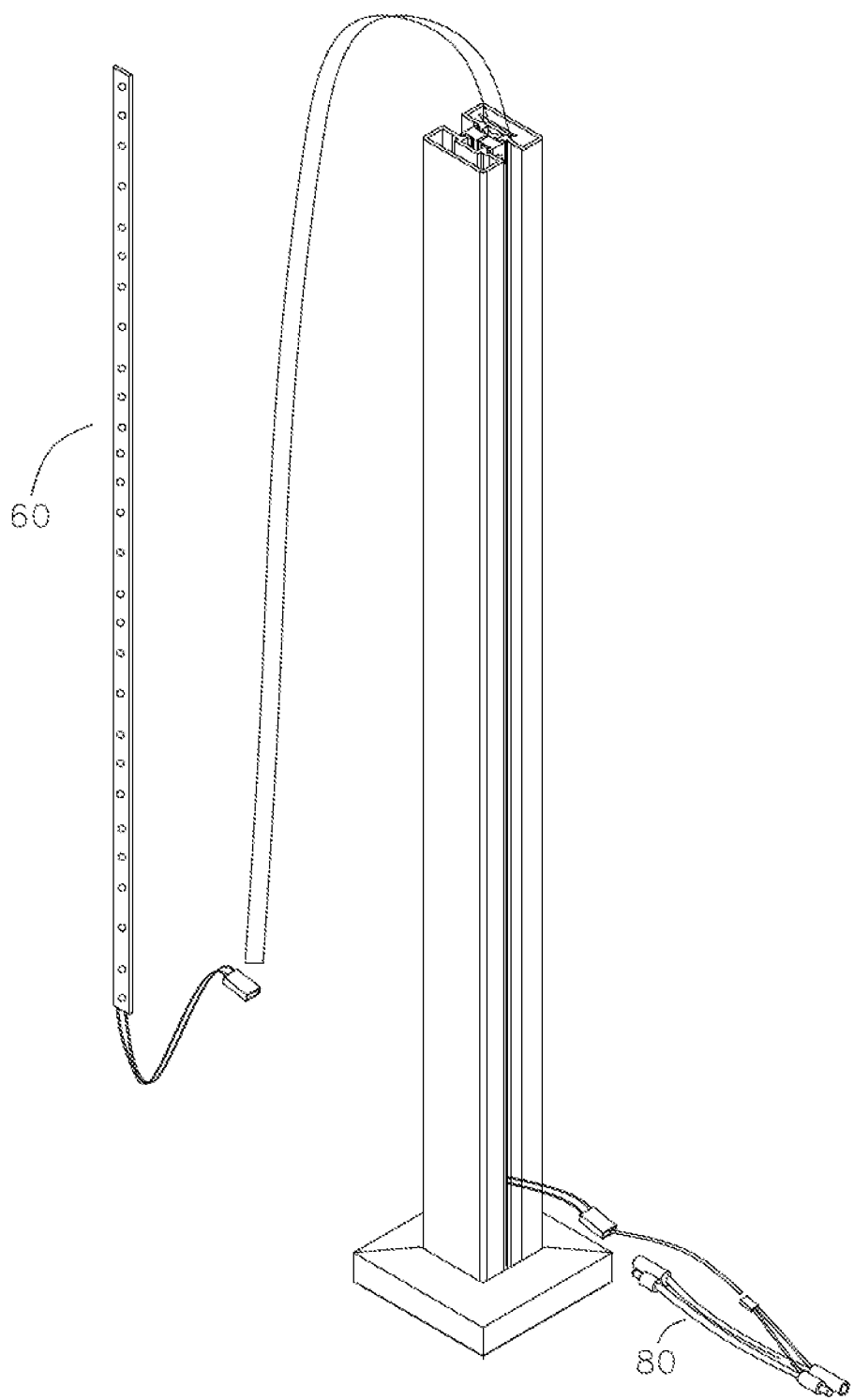
FIG. 3 is schematic drawing during assembly of a preferred embodiment of LED glass fence.

Referring to FIG. 1 to 3, it is a preferred embodiment of the LED glass fence 100 which provided with the present application, in this embodiment, An LED glass fence 100 comprises several main bodies 10, an upper cover 20, transparent board 30, a decorative cover 40, a pedestal 50, LED strip 60, color graphics adjusting belt 70, electrical wire 80 and sealing cap 90.

Each of said main body 10 is aluminum profile, and its cross profile is two square frame which are set up and down. The said main bodies 10 are fixed to each other by screws. A gap 11 is formed between several said main bodies 10. In the present embodiment, the number of said main body 10 is two. A groove 12 is formed between the sides of two said main bodies 10. Said groove 12 connects to said gap 11. Said LED strip 60 is housed in said gap 11.

Said LED glass fence 100 also includes two rollers 13 and a driving device 14, the mounting position of two said rollers 13 is selected from the group consisting of said main body 10, said upper cover 20 and said pedestal 50. A said roller 13 connects with said driving device 13 fixedly. Said color graphics adjusting belt 70 is provided with several different shapes and different color of patterns. Said color graphics adjusting belt 70 is set between two said rollers 13 and rotates with the rotation of said rollers 13. Each pattern corresponds to a light source of said LED strip 60.

Said upper cover 20 is fixedly assembled on the other end of several said main bodies 10 to make the said main bodies 10 to be sealed. In the present embodiment, said upper cover 20 is a solar panel. Said upper cover 20 provides power supply for said driving device. Said transparent board 30 can be replaced by glass board. There are two said transparent board 30, two said transparent board 30 are assembled respectively in the edge of said grooves 12 which are formed in the two sides of said main bodies 10; concretely, two said transparent board 30 are fixed respectively by transparent board installation first auxiliary part component 92 and transparent board installation second auxiliary component 93.

An end of said LED strip 60 is connected with said electrical wire 80, and electrically connects to a power source by said electrical wire 80. Said sealing cap 90 is mounted on said main body 10 in order to make the junction of said LED strip 60 and said electrical wire 80 to be sealed. Several said main bodies 10 welded on said pedestal 50, said pedestal 50 is fixed to the ground by fasteners 91, and said decorative cover 40 is fixed to the surface of said pedestal 50 fixedly.

Said LED glass fence 100 also includes a control device and a sound sensor, said control device is electrically connected with said sound sensor and said LED strip 60, when the volume of sound signal received from said sound sensor is increasing, said control device controls said LED strip 60 to weaken the brightness; when the volume of sound signal received from said sound sensor is reducing, said control device controls said LED strip 60 to enhance the brightness. Said sound sensor receives a sound signal whose volume is at 15-80 DB.

When the LED glass fence 100 is used, the light of said LED strip 60 radiates outward after the refraction of said transparent board 30, said driving device can drive said color graphics adjusting belt 70 to rotate, which make the light emitted by said LED strip 60 can produce different colors and patterns after passing through said color graphics adjusting belt 70, to create a beautiful light effect. When a person approaches from a distance, the brightness of said LED strip 60 will gradually decrease, which can avoid the situation that the lights are not bright enough to see roads or scenery when people is in the distance, but also can avoid the situation that the lights are too bright and cause people feel dazzling when people is in the nearby. What's more, a number of LED glass fences 100 form a guardrail. These led glass fences 100 connect to each other by glass or something like a flake, and then the light of said LED strip radiates outward after the refraction of said transparent board which will make the guardrail to be bright.

According to the design as mentioned above, the LED glass fence 100 has protection function and can be used for lighting at the same time, and can be as a landscaping lamp; it has multiple functions.

The embodiment of the present application described above is just a preferred embodiment, it is not just limited to the above embodiment, any other change, like modifications, substitutions, combinations, simplification, made in the present application does not depart from the spirit and principles, shall be equivalent replacement and included within the scope of the present application.

What is claimed is:

1. An LED glass fence comprising several main bodies, an upper cover and a pedestal, said pedestal is fixed to the ground, several said main bodies are fixed to each other and fixedly to mounted on said pedestal, said upper cover is fixedly assembled on the other end of several said main bodies, a gap and a groove are formed between several said main bodies, said gap connects to said groove, said LED glass fence also includes an LED strip and a transparent board, said LED strip is housed in said gap, said transparent board is fixedly assembled in the edge of said groove, the light of said LED strip radiates outward after the refraction of said transparent board wherein said LED glass fence also includes a control device and a sound sensor, said control device is electrically connected with said sound sensor and said LED strip, when the volume of sound signal received from said sound sensor is increasing, said control device controls said LED strip to weaken the brightness; when the volume of sound signal received from said sound sensor is reducing, said control device controls said LED strip to enhance the brightness.

2. The LED glass fence as mentioned in claim 1, said LED glass fence also includes a color graphics adjusting belt and two rollers, said color graphics adjusting belt is provided with several different shapes and different color of patterns, the mounting position of two said rollers is selected from the group consisting of said main body, said upper cover and said pedestal, said color graphics adjusting belt is set between two said rollers, and then with the rotation of said rollers, light emitted by said LED strip can produce different colors and patterns after passing through said color graphics adjusting belt.

3. The LED glass fence as mentioned in claim 2, said upper cover is a solar panel, said LED glass fence also includes a driving device, a said roller connects with said driving device fixedly, said solar panel provides power supply for said driving device to drive said roller to turn.

4. The LED glass fence as mentioned in claim 1, said LED glass fence also includes a decorative cover, said decorative cover is assembled on said pedestal fixedly.

5. The LED glass fence as mentioned in claim 1, said sound sensor receives a sound signal whose volume is at 15-80 DB.

6. The LED glass fence as mentioned in claim 1, said LED glass fence also includes an electrical wire, said LED strip is electrically connected to a power source by said electrical wire.

7. The LED glass fence as mentioned in claim 6, said LED glass fence also includes a sealing cap, said sealing cap is mounted on said main body in order to make the junction of said LED strip and said electrical wire to be sealed.

8. The LED glass fence as mentioned in claim 1, said main body is a profile, and the cross profile of said main body is two square frame which are set up and down.

\* \* \* \* \*